United States Patent [19]
Billings

[11] 3,983,882
[45] Oct. 5, 1976

[54] METHOD AND APPARATUS FOR HYDROGEN FUELED INTERNAL COMBUSTION ENGINES

[75] Inventor: Roger Evan Billings, Provo, Utah

[73] Assignee: Billings Energy Research Corporation, Provo, Utah

[22] Filed: Mar. 3, 1975

[21] Appl. No.: 554,533

Related U.S. Application Data
[63] Continuation of Ser. No. 385,439, Aug. 3, 1973.

[52] U.S. Cl. .............................. 123/1 A; 123/25 A; 123/DIG. 12
[51] Int. Cl.$^2$ .................... F02D 19/00; F02D 47/00
[58] Field of Search............ 123/DIG. 12, 1 A, 25 A

[56] References Cited
UNITED STATES PATENTS

| | | | |
|---|---|---|---|
| 1,268,648 | 6/1918 | Van Meter............................ | 137/62 |
| 3,608,529 | 9/1971 | Smith et al................ | 123/DIG. 12 X |
| 3,616,779 | 11/1971 | Newkirk ......................... | 123/120 X |
| 3,646,924 | 3/1972 | Newkirk et al. .......... | 123/DIG. 12 X |
| 3,672,341 | 6/1972 | Smith et al................ | 123/DIG. 12 X |
| 3,682,142 | 8/1972 | Newkirk ............................. | 123/1 A |
| 3,696,795 | 10/1972 | Smith et al.......................... | 123/1 A |
| 3,710,770 | 1/1973 | Newkirk et al. ..................... | 123/120 |

OTHER PUBLICATIONS
"The UCLA Hydrogen Car" by A. F. Bush and W. D. Van Vorst, Paper Presented at Cryogenic Conference Aug. 8–10, 1973, from Advances in Cryogenic Engineering.

*Primary Examiner*—Charles J. Myhre
*Assistant Examiner*—Tony M. Argenbright
*Attorney, Agent, or Firm*—Criddle, Thorpe & Western

[57] ABSTRACT

The hydrogen engine hereof introduces water as vapor with inlet hydrogen and air, as a mixture proportioned for practical internal combustion and efficient power output. Water vapor is a substantial component of the exhaust of hydrogen fueled engines. In one embodiment of the invention, water vapor is condensed from the exhaust, and thereupon arranged to provide the input water as a continuing self-supporting process. The resultant emissions are very low in oxides of nitrogen, and readily meet the EPA Standards on pollutants as presently set for 1976. Further, and importantly, engine backfire is eliminated in the operation. Also, engine output power and efficiency are improved with the invention principles.

32 Claims, 6 Drawing Figures

METHOD AND APPARATUS FOR HYDROGEN FUELED INTERNAL COMBUSTION ENGINES

BACKGROUND OF THE INVENTION

This is a continuation of application Ser. No. 385,439, filed Aug. 3, 1973.

Water introduction has been proposed for gasoline internal combustion engine (ICE) systems to moderate peak cycle temperature, and thereby reduce formation of oxides of nitrogen (NOx). However, the water vapor increased the emission of carbon monoxide (CO) and hydrocarbons (HC[s]) in the exhaust. The resultant pollutants of such gasoline fueled engine thus were poor.

One approach to hydrogen ICE systems utilizes the recirculation of exhaust products back as a substantial portion of the input charge, as taken directly from the exhaust. Nevertheless no significant reduction in NOx formation occurs until excess oxygen in the cylinders is almost completely displaced by exhaust gases but this reduces output power and efficiency.

SUMMARY OF THE INVENTION

The hydrogen fueled ICE system hereof utilizes direct water induction to provide improved operation. Conventional ICE engine structures and tooling are used. Although water from any source could be used, in accordance with one embodiment of the invention, water vapor formed during the hydrogen/air combustion process, together with that introduced through the input, are withdrawn and condensed for reintroduction into the system. A reservoir maintains a water level ample for the induction operation. Sufficient water is produced to maintain predetermined vapor input. No compromise as to HC or CO generation is required as in gasoline and liquified gas systems, as neither is generated in hydrogen combustion.

The formation of $NO_x$ is significantly reduced over prior hydrogen ICE systems by maintaining an optimum range of the mass ratio of input water to hydrogen, as will be set forth. Backfiring to the intake manifold is eliminated as a problem in the hydrogen fueled system hereof. The input water vapor quenches the hydrogen combustion process, thereby slowing down the hydrogen combustion rate, and thus potential backfiring.

Water from the maintained reservoir is pumped to an injector nozzle or carburetor, and in turn admixed with the input hydrogen to the cylinders. A static water storage tank is unneeded but could by employed if desired. Thermostatically controlled drains automatically empty water-using components to prevent their freezing-up when the engine is out of use. Antifreeze is not required. Sufficient water becomes available promptly upon engine startup. Water replenishment or storage are thus obviated. The terms "water vapor" and "vapor" are used to mean: (a) the vapor of water; (b) water mist; (c) water spray; (d) water droplets; (e) or any equivalent or combination thereof.

THE DRAWINGS

DESCRIPTION OF THE INVENTION

Figure 1:
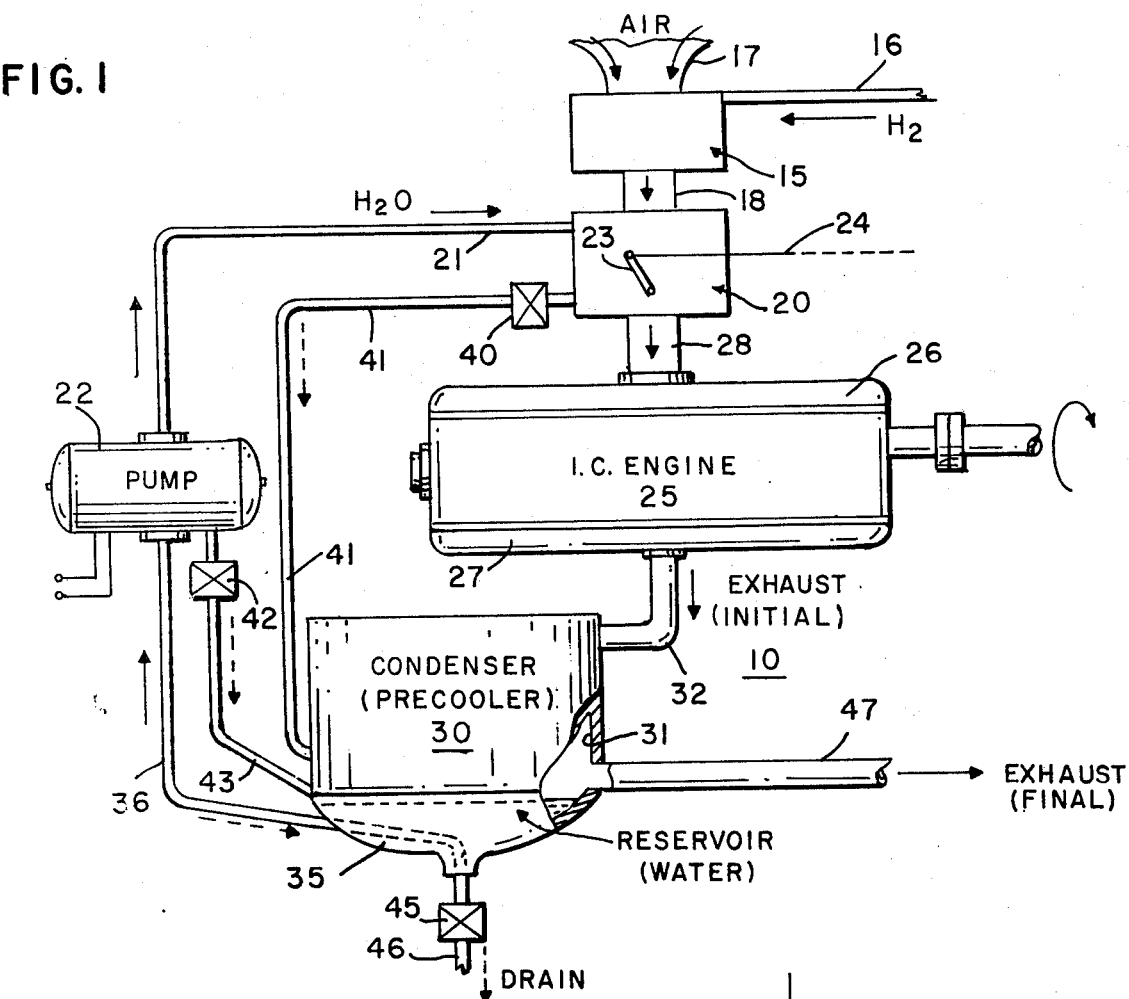
FIG. 1 is a diagrammatic representation of an exemplary form of the hydrogen fueled engine system in accordance with the present invention.

The engine system 10 of FIG. 1 utilizes two carburetors 15 and 20 in series flow relation. Carburetor 15 is for the hydrogen ($H_2$) input via supply line 16. Line 16 is supplied with gaseous $H_2$ at relatively low pressure; can be reduced from a tank at high pressure. Air input duct 17 leads into the carburetor 15. The air is mixed in preset proportion with the hydrogen, in conventional manner.

Figure 2:
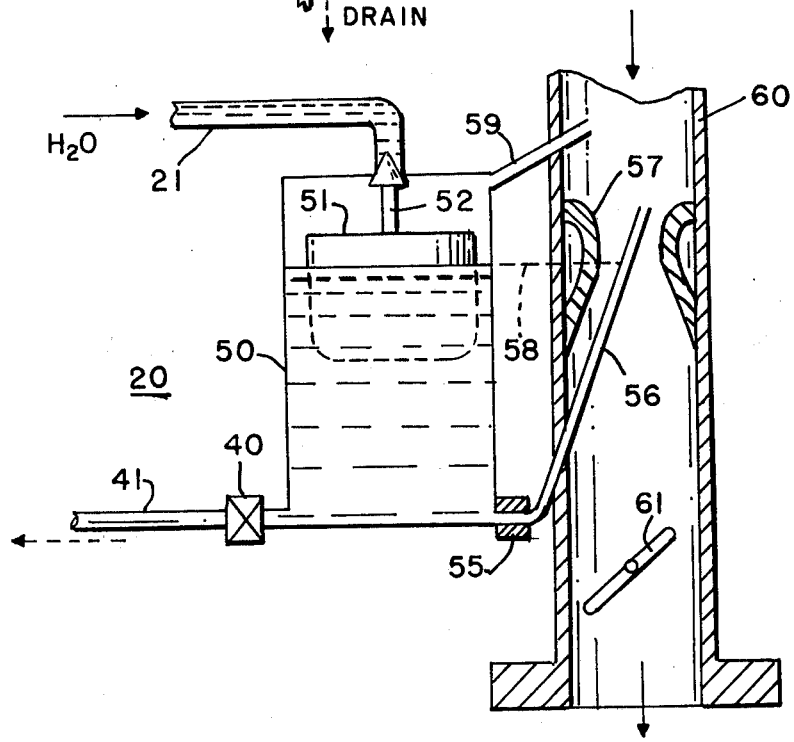
FIG. 2 is a schematic showing, in cross-section, of a carburetor for converting water to inlet vapor and mixing it in predetermined mass ratio to the hydrogen as used.

A commercially available carburetor for unit 15 is an air/gas valve diaphragm-operated type, as made by Impco. The $H_2$/air mixture from carburetor 15 is directed into water carburetor 20 via duct 18. Carburetor 20 may be a usual gasoline type, serving as the water ($H_2O$) metering device. FIG. 2 is a schematic showing of carburetor 20 hereof, and is described later on. The carburetors 15 and 20 are readily adapted for the hydrogen and for the water flow respectively, by making their jet nozzles of suitable size, or adjusting their metering as indicated.

Condensed water is directed into carburetor 20 via supply line 21 by pump 22. The predetermined mass ratio of water vapor to hydrogen is substantially maintained by the settings in carburetor 20. The overall air proportion with respect to both the $H_2$ and $H_2O$ is also maintained by the carburetors 15,20 over the engine power operating range, as will now be understood by those skilled in the art. The pivoted throttle valve therein is controlled by lever 23 and wire 24. The mixture of air, $H_2$ and $H_2O$-vapor in the quantity or volume as determined by the throttle setting, is conducted into the intake manifold 26 of engine 25 through inlet 28. It is to be understood that the physical positions of carburetors 15 and 20 may be reversed in system 10, with the same results.

The initial engine exhaust is introduced directly to condenser 30 by tubing 32 from the exhaust manifold 27. The condenser 30 serves as a precooler, and acts to muffle sounds from the engine. The interior surface of the walls 31 of condenser 30 are proportioned to condense out and convert contained water vapor into sufficient water for the peak demands of the engine/vehicle. The water enters the reservoir 35 thereof, and is retained for the induction to the engine. A feed line 36 extends from an opening in the lower region of reservoir 35 to the input of the water pump 22. The pump 22 creates a forward pressure on water line 36 and into water supply line 21 to carburetor 20. Pump 22 may be electrically driven, or be a mechanical one. The pump input can back drain via line 36.

For a 50 brake horsepower (BHP) vehicle, such as a small Volkswagen, up to 12 gallons of inducted water may be used per hour of operation. A 12 volt, one ampere motor for the pump 22 would be satisfactory therefor. Cars with larger engines would require proportionally higher water flow rates at rated power, and correspondingly larger pumps. The condenser 30 system is designed to condense out water at a sufficient rate to serve under all steady-state drive conditions. The reservoir 35 is included to store enough water to at least handle rapid transient drive demands, such as passing another car at high speed. About one-half a liter of water for such spurts is sufficient reserve for a 50 BHP vehicle, and proportionately more for larger cars. Residual gases and water vapor from the exhaust within condenser 30, together with excess condensed water or overflow from reservoir 35, exit through "final" exhaust pipe 47, the tail pipe.

An important feature of the invention engine system is to automatically prevent water freeze-up in the components of the induction water sub-system 20,22,35 during engine non-use in cold conditions. Towards this end a thermostatically controlled valve is placed at a drain port of water carburetor 20, at the chamber drain of pump 22, and at the base of the reservoir 35. Thermal valve 40 at the base of carburetor 20 communicates to condenser 30 via tubing 41. Thermal valve 42 at pump 22 also is drained into condenser 30 via tubing 43. Thermostatically controlled valve 45 drains the reservoir 35 through exit piping 46. The thermostatic controls 40,42,45 are preset to actuate their respective valves to "open" to effect their drain function at and below a predetermined temperature. The preset temperature depends upon respective location in the engine compartment, and somewhat empirical determination with respect to ambient temperature and wind velocity at the vehicle for the water to freeze. Settings in the range of 32° F to even 40° are thus in order, a "safe" one being 35° F.

In any event, when the engine is in operation the compartment temperature is much above the 35° F mark, and the valves remain "closed" even during sub-freezing wintry weather. The water condensation and induction process thereupon proceeds. During engine startup with the water drained, the engine warms up rapidly and triggers these temperature set valves to "closed". Further, the startup exhaust contains sufficient water vapor to be condensed in 30, pumped by 22, carbureted at 20, and amply be inducted to engine 25 with the hydrogen. In fact, the reservoir 35 soon fills up as well.

An exemplary water carburetor 20 is illustrated in FIG. 2. It is basically like a gasoline type. The water supply line 21 ends at a needle valve at the upper part of receiving chamber 50. When sufficient water is in chamber 50 the float 51 closes needle valve 52. A metering orifice or jet 55 is at the base of chamber 50. It proportions the flow of water into tube 56 that extends to the throat of venturi 57, and is above the water level 58. A vent line 59 extends from chamber 50 into mixing chamber 60. Throttle valve 61 is positioned in the exit region of chamber 60.

Figure 3:
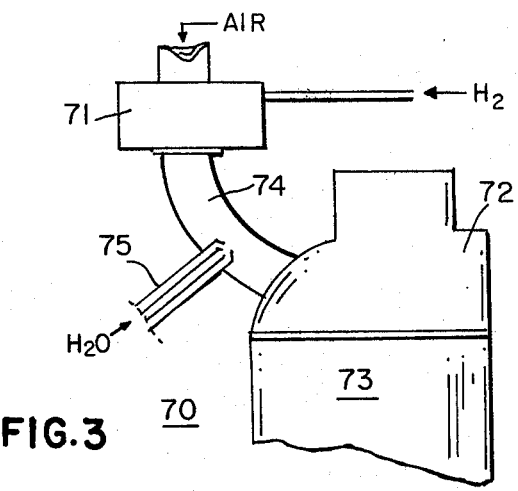
FIGS. 3, 4 and 5 show modified forms of the invention system.
Figure 4:
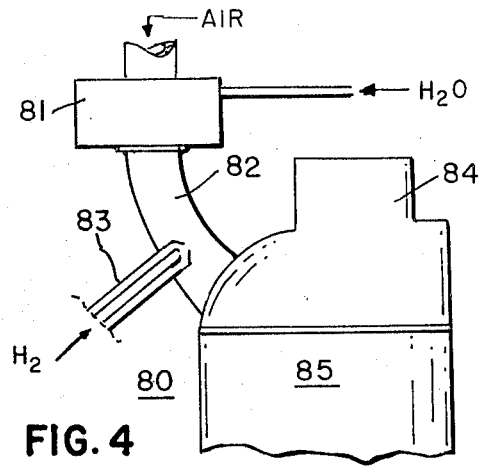

FIGS. 3 and 4 show modified versions of the exemplary engine system 10 of FIG. 1. System 70 of FIG. 3 is the same as system 10 except that jet nozzle injection of water is used in place of carburetion. The hydrogen ($H_2$) is carbureted by unit 71 and ducted to the cylinder head 72 of engine 73, by tube 74. An injector nozzle 75 is arranged to enter into pipe 74. Water ($H_2O$) is injected into duct 74 in measured amount through nozzle 75, in known manner. The resultant water spray mixes with carbureted hydrogen, and is passed to the intake manifold in cylinder head 72. The mass ratio of the water to hydrogen in the combined mixture (with air) is predetermined as set forth hereinafter, for optimum results.

FIG. 4 shows an engine system 80 wherein the water is carbureted at 81, and the hydrogen is injected into common duct 82 by injector nozzle 83. The combined air, $H_2$ and $H_2O$-vapor mixture is conveyed by duct 82 to the cylinders in head 84 of engine 85. System 80 is the inverse of system 70 as to carburetion/injection approach for the $H_2/H_2O$. Another system is 90 of FIG. 5. The intake manifold 91 directs air towards the intake valve(s) 96. The hydrogen and the water both are separately injected into intake manifold 91 through respective injector nozzles 92,93. A predetermined ratio of air, $H_2$ and $H_2O$-vapor enters the cylinder(s) 95 when their respective intake valve(s) 96 are open. The combustion by-products from cylinder(s) 95 exist through the exhaust manifold 94 after exhaust valve(s) 96 are successively opened into it.

Figure 5:
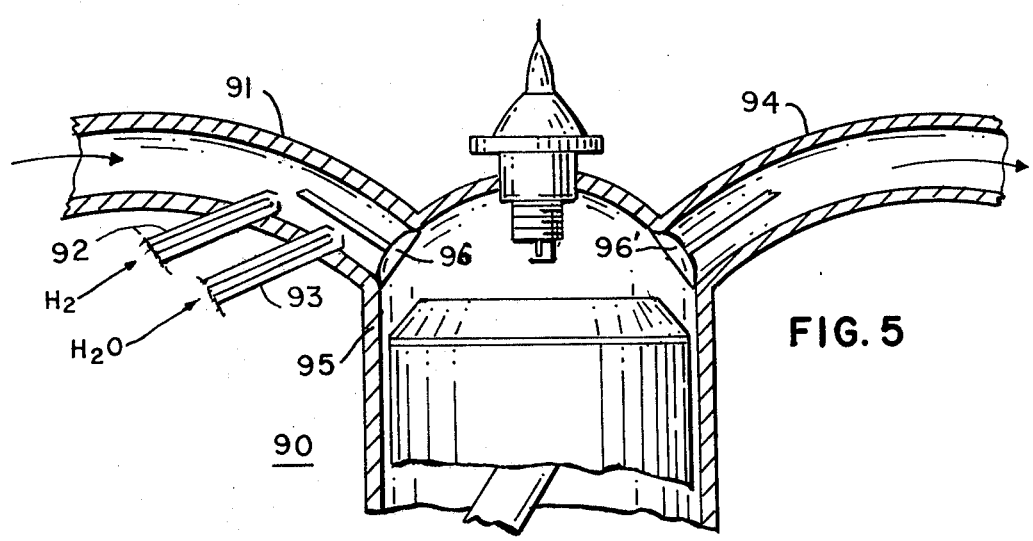

Engine system 10 per FIG. 1 with series carburetion of the $H_2$ and $H_2O$ is simpler and lower in cost than the systems of FIGS. 3, 4 and 5. The injectors of the latter system may be mechanical devices known in the art. Also, electronic injectors may be used, such as manufactured by the Robert Bosch company of Stuttgart, Germany. Further, as stated, the physical order of the $H_2$ and $H_2O$ induction and/or injection is optional. The term "induction" is used to mean that mixing is accomplished by the fluid dynamics of the intake system, as by vacuum, venturi, orifices, and the like. The term "injection" is used to mean that the input is forced directly through an injector nozzle, as by a pump. "Introduction" is used herein as a generic term with respect to "induction" and "injection", or other manner of presenting gaseous hydrogen and/or water vapor to the engine intake in its operation.

The condenser, as 30 in FIG. 1, may be an "open box" type as indicated. Its internal walls 31 serve as the condensing structure. Walls 31 are exposed internally to the hot vapor-laden exhaust. The exterior of the walls are exposed to the ambient temperature in the engine compartment region cooling them, and thus the gases and vapor inside. For a small (50 BHP) vehicle, about 2.5 square feet of internal wall 31 surface will continuously condense-out sufficient water for the engine systems hereof. The surface required is generally linear with BHP requirement. Thus a 100 BHP car would use about 5 square feet therefor. A "collection chamber" as within unit 30, is preferably included wherein the dynamic pressure ($PV^2$) is less* than four so that water droplets will precipitate from the exhaust stream rather than for the most part be blown out through the tail pipe 47. The condenser 30 configuration and size may be optimized in well known manner: as by corrugation of the walls; by interior finned tubing as through which an engine cooling medium passes; etc.

*in English units

As hereinabove stated, the water induction system hereof, unlike exhaust recirculation, has positive advantages both on emissions and on performance. Reference is made to the test curves of FIG. 6. The control variable thereof is the mass ratio of water to hydrogen in the intake of the invention systems. At very low water injection or induction, as at the order of a one-to-one mass ratio, the test hydrogen fueled engine generated over 100 PPM of nitric oxide (NO). The logarithmic scale for NO shows the order of 10 PPM of NO when the mass ratio of $H_2O/H_2$ is five (5). It is noted that backfiring thereof ceases at mass ratios above two (2). In fact, as the mass ratio is increased, the NO generated rapidly falls off towards zero at a ratio of 15:1.

The power output and thermal efficiency are improved by 4% at an $H_2O/H_2$ ratio of 3.5:1, while NO was reduced 90%. With the water to hydrogen ratio increased to 5:1 the engine may be operated with full stoichiometric mixtures, thus operating at its maximum power without backfiring. This is a particularly important result for the conversion of gasoline to $H_2$ powered automobiles. They can be operated at leaner more efficient mixtures for cruising conditions and employ richer full-throttle hydrogen metering to obtain bursts of power during acceleration without backfiring.

Figure 6:
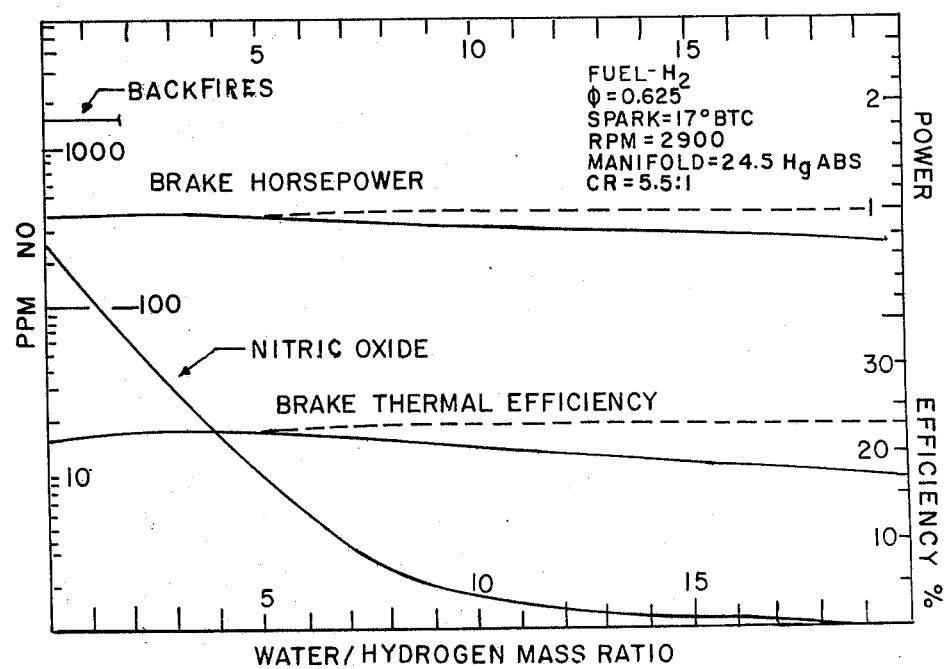
FIG. 6 is a set of curves that illustrate performance of the engine system upon variation of the ratio of water induction.

The test ICE engine used to derive the curves of FIG. 6 using water introduction had the following physical parameters with iso-octane (Standard gasoline):

| (a) Peak Power | = 1.73 BHP | at $\phi' = 1.16$ |
|---|---|---|
| (b) Max. BTE | = 21.5% | at $\phi' = 0.93$ |
| (c) Max. NO | = 800 PPM | at $\phi' = 0.93$ |

| For Fig 6: | | $\phi$ is the hydrogen-air equivalence ratio; the fraction of hydrogen used relative to the chemically correct quantity for a given amount of oxygen. |
|---|---|---|
| | BHP | is brake horsepower |
| | BTE | is brake thermal efficiency |
| Also: | BTC | is the spark advance position "before top center". |
| | CR | is compression ratio. |

A simulation of the aforesaid technique on the test engine resulted in 1.28 BHP or 74% of the maximum power obtainable by the engine operating on gasoline. This result is considered to be very competitive with the actual output of modern gasoline engines which are tuned for minimum emissions rather than maximum power. With use of rich mixtures of hydrogen fuel and water induction in the 50 BHP Volkswagen referred to, the acceleration available was quite comparable to that of the car when fueled with gasoline.

What is claimed is:

1. An internal combustion engine having an engine fuel intake and one or more cylinders in which fuel combustion occurs, said engine including first means for introducing gaseous hydrogen and air in metered relation to the engine intake for sequential combustion in the cylinders, second means for producing water droplets, spray or mist from supplied liquid water and for introducing said water droplets, spray or mist to said intake in conjunction with the hydrogen and air, means for condensing exiting resultant water vapor of the hydrogen combustion process, and means for supplying the condensed water to said second means in such proportion whereby the engine is supplied with hydrogen, water and air at its intake to inhibit backfiring in its operation.

2. An internal combustion engine as in claim 1, in which said first means is a carburetor that is adjusted to supply the intake hydrogen with intake air.

3. An internal combustion engine as in claim 2, in which said second means is a carburetor positioned in series flow relation to said first means carburetor for producing water droplets, spray or mist from input water and being adjustable to supply the intake water in a predetermined mass ratio proportion to the intake hydrogen generally over the engine operating range.

4. An internal combustion engine as in claim 3, in which said second carburetor means includes a metering device that in general maintains the mass ratio of the water to hydrogen at the engine intake at a predetermined level.

5. An internal combustion engine as in claim 4, in which said metering device maintains the mass ratio of water to hydrogen at the engine intake in the order of 2:1 or greater.

6. An internal combustion engine as in claim 3, in which said first and second carburetor means are adjusted to maintain the mass ratio of the water to hydrogen at the engine intake in the order of 2:1 or greater.

7. An internal combustion engine as in claim 2, in which said second means is a device for injecting water droplets, spray or mist in predetermined ratio amount over the engine operating range.

8. An internal combustion engine as in claim 7, in which said second means injects water vapor at a rate to maintain the mass ratio of water to hydrogen at the engine intake in the order of 2:1 or greater.

9. An internal combustion engine as in claim 1, in which said first means is a device for injecting hydrogen gas in predetermined ratio over the engine operating range.

10. An internal combustion engine as in claim 9, in which said second means is a carburetor that produces water droplets, spray or mist from input water and is adjusted to supply the intake water in a predetermined mass ratio proportion to the intake hydrogen generally over the engine operating range.

11. An internal combustion engine as in claim 9, in which said second means is a device for injecting water droplets, spray or mist in predetermined mass ratio amount to the injected hydrogen.

12. An internal combustion engine as in claim 1, which said first and second means are adjusted to maintain the mass ratio of the water to hydrogen at the engine intake in the order of 2:1 or greater.

13. An internal combustion engine as in claim 1, in which said condensing means comprises a reservoir for collecting condensed water, said reservoir including an opening therein, and in which said water supplying means is connected to said reservoir for receiving water through said opening.

14. An internal combustion engine as in claim 13, in which said condensing means further comprises walls defining a chamber above said reservoir for condensing water vapor introduced thereinto, means for introducing the exhaust of the hydrogen combustion process into said chamber, and means for conducting from said chamber the exhaust products remaining after condensation.

15. An internal combustion engine as in claim 1, further including draining means for draining water from the condensing means to prevent freeze-up of water therein while the engine is out of use during freezing weather conditions.

16. An internal combustion engine as in claim 15, further including a second draining means for draining water out of said second means to prevent freeze-up of water therein.

17. An internal combustion engine as in claim 16, further including third draining means for draining water out of said water supplying means to prevent freeze-up of water therein.

18. An internal combustion engine as in claim 17, further including means for conveying water from said second draining means to said condensing means, and means for conveying water from said third draining means to said condensing means.

19. An internal combustion engine as in claim 15, in which said draining means is thermostatically controlled and includes a valve.

20. In an internal combustion engine having an engine fuel intake, one or more chambers in which fuel combustion occurs, and structure for introducing air into the engine intake, the improvement comprising first means for introducing gaseous hydrogen into the air introducing structure for combustion in the chambers, second means for producing finely divided water, including droplets, spray or mist, from input water and for introducing the finely divided water into the air introducing structure in conjunction with the hydrogen, a reservoir for holding water, and means for conveying water from said water reservoir to said second means, said first and second means being adapted to supply the intake hydrogen and intake water in such proportion as to inhibit backfiring.

21. An internal combustion engine as in claim 20 wherein said first means comprises a carburetor and said second means comprises a carburetor in series relation with the first carburetor means, said second carburetor means being adapted to produce finely divided water from input water.

22. An internal combustion engine as in claim 20 wherein said first means comprises a carburetor and said second means comprises a device for injecting finely divided water into the air introducing structure.

23. An internal combustion engine as in claim 20 wherein said first means is a device for injecting hydrogen gas into the air introducing structure and said second means comprises a carburetor adapted to produce finely divided water from input water.

24. An internal combustion engine as in claim 20 wherein said first means comprises a device for injecting hydrogen gas into the air introducing structure and said second means comprises a device for injecting finely divided water into the air introducing structure.

25. An internal combustion engine as in claim 20 wherein said first and second means are adapted to maintain the mass ratio of the water to hydrogen in the order of 2:1 or greater.

26. An internal combustion engine as in claim 20 further including draining means for draining water from said water reservoir to prevent freeze-up of water therein during freezing conditions.

27. An internal combustion engine as in claim 26 further including draining means for draining water from said second means into said water reservoir and from said water conveying means into said reservoir to prevent freeze-up of water in the second means and in the water conveying means during freezing weather conditions.

28. An internal combustion engine as in claim 20 further including means for condensing water vapor contained in the exhaust from the hydrogen combustion process and for depositing such condensed water in said water reservoir.

29. An internal combustion engine as in claim 28 further including means for removing from the condensing means exhaust products remaining after condensation.

30. A method of inhibiting backfiring in a hydrogen-fueled internal combustion engine comprising
 a. introducing gaseous hydrogen and air in metered relation to the engine intake for combustion in the cylinders,
 b. storing water,
 c. producing liquid water droplets, spray or mist from the stored water, and
 d. applying the droplets, spray or mist to the engine intake for admixing with the hydrogen in a predetermined mass ratio sufficient to inhibit backfiring.

31. A method as in claim 30 wherein step (b) comprises
 f. condensing water vapor contained in the exhaust from the hydrogen combustion process, and
 g. depositing the condensed water in a storage reservoir.

32. A method as in claim 30 wherein water is admixed with hydrogen in a mass ratio of water to hydrogen in the order of 2:1 or greater.

* * * * *